(12) United States Patent
Bengio et al.

(10) Patent No.: US 10,417,557 B2
(45) Date of Patent: Sep. 17, 2019

(54) GENERATING NATURAL LANGUAGE DESCRIPTIONS OF IMAGES

(71) Applicant: Google LLC, Mountain View, CA (US)

(72) Inventors: Samy Bengio, Los Altos, CA (US); Oriol Vinyals, London (GB); Alexander Toshkov Toshev, San Francisco, CA (US); Dumitru Erhan, San Francisco, CA (US)

(73) Assignee: Google LLC, Mountain View, CA (US)

( * ) Notice: Subject to any disclaimer, the term of this patent is extended or adjusted under 35 U.S.C. 154(b) by 69 days.

(21) Appl. No.: 15/856,453

(22) Filed: Dec. 28, 2017

(65) Prior Publication Data

US 2018/0204112 A1    Jul. 19, 2018

Related U.S. Application Data

(63) Continuation of application No. 14/941,454, filed on Nov. 13, 2015, now Pat. No. 9,858,524.

(60) Provisional application No. 62/080,081, filed on Nov. 14, 2014.

(51) Int. Cl.
*G06N 3/04* (2006.01)
*G06F 17/28* (2006.01)

(52) U.S. Cl.
CPC .......... *G06N 3/0472* (2013.01); *G06F 17/28* (2013.01); *G06N 3/0454* (2013.01)

(58) Field of Classification Search
None
See application file for complete search history.

(56) References Cited

U.S. PATENT DOCUMENTS

| | | | |
|---|---|---|---|
| 8,504,361 B2 | 8/2013 | Collobert et al. | |
| 8,775,341 B1 | 7/2014 | Commons | |
| 9,477,654 B2 | 10/2016 | He et al. | |
| 9,519,858 B2 | 12/2016 | Zweig et al. | |
| 9,760,806 B1 * | 9/2017 | Ning | B60W 50/14 |
| 10,083,169 B1 * | 9/2018 | Ghosh | G06F 17/279 |
| 10,181,098 B2 * | 1/2019 | Vinyals | G06N 3/02 |
| 10,229,111 B1 * | 3/2019 | Filippova | G06F 17/277 |
| 10,255,269 B2 * | 4/2019 | Quirk | G06F 17/2775 |
| 2011/0301942 A1 | 12/2011 | Collobert et al. | |
| 2016/0034812 A1 | 2/2016 | Gibson et al. | |

(Continued)

FOREIGN PATENT DOCUMENTS

CN    1869965 A    11/2006

OTHER PUBLICATIONS

Office Action issued in European Application No. 15805661.4, dated Feb. 7, 2019, 7 pages.

(Continued)

*Primary Examiner* — Iman K Kholdebarin
(74) *Attorney, Agent, or Firm* — Fish & Richardson P.C.

(57) ABSTRACT

Methods, systems, and apparatus, including computer programs encoded on computer storage media, for generating descriptions of input images. One of the methods includes obtaining an input image; processing the input image using a first neural network to generate an alternative representation for the input image; and processing the alternative representation for the input image using a second neural network to generate a sequence of a plurality of words in a target natural language that describes the input image.

20 Claims, 4 Drawing Sheets

(56) References Cited

U.S. PATENT DOCUMENTS

| | | | | |
|---|---|---|---|---|
| 2016/0140435 | A1* | 5/2016 | Bengio | G06F 17/28 |
| | | | | 382/158 |
| 2016/0180215 | A1* | 6/2016 | Vinyals | G06F 17/2705 |
| | | | | 706/20 |
| 2017/0192956 | A1* | 7/2017 | Kaiser | G06F 17/271 |
| 2017/0228633 | A1* | 8/2017 | Danihelka | G06K 9/6257 |
| 2017/0255832 | A1* | 9/2017 | Jones | G06K 9/00718 |
| 2017/0364744 | A1* | 12/2017 | Savchenkov | G06K 9/00409 |
| 2018/0189274 | A1* | 7/2018 | Noh | G06F 17/2881 |
| 2018/0276535 | A1* | 9/2018 | Mohamed | G06N 3/063 |
| 2018/0300317 | A1* | 10/2018 | Bradbury | G06F 17/289 |
| 2018/0300400 | A1* | 10/2018 | Paulus | G06F 17/289 |
| 2018/0336452 | A1* | 11/2018 | Tschernezki | G06N 3/0445 |
| 2019/0019036 | A1* | 1/2019 | Yoo | G06K 9/00718 |
| 2019/0034416 | A1* | 1/2019 | Al Hasan | G06F 17/2785 |
| 2019/0034591 | A1* | 1/2019 | Mossin | G06N 3/08 |
| 2019/0035020 | A1* | 1/2019 | Jain | G06N 20/00 |

OTHER PUBLICATIONS

Farhadi et al., "Every Picture Tells Story: Generating Sentences from Images," Sep. 5, 2010, Computer Vision—ECCV 2010, Springer Berlin Heidelberg, Berlin, Heidelberg, pp. 15-29.

Frome et al., "DeViSE: A Deep Visual-semantic Embedding Model," 2013 [online] (retrieved from http://research.google.com/pubs/pub41473.html), 11 pages.

Graves, "Sequence Transduction with Recurrent Neural Networks," arXiv:1211.3711v1 [cn.NE], Nov. 14, 2012, pp. 1-9.

International Preliminary Report on Patentability in International Application No. PCT/US2015/060743, dated May 26, 2017, 10 pages.

International Search Report and Written Opinion in International Application No. PCT/US2015/060743, dated Feb. 15, 2016, 15 pages.

Karpathy et al., "Deep Fragment Embeddings for Bidirectional Image Sentence Mapping," arXiv:1406.5679v1 [cs.CV], Jun. 22, 2014, pp. 1-9.

Kiros et al., "Multimodal Neural Language Models," in *NIPS Deep Learning Workshop*, 2013, (retrieved from http://www.cs.toronto.edu/~rkiros/papers/mnlm2013.pdf),14 pages.

Kiros et al., "Unifying Visual-semantic Embeddings with Multimodal Neural Language Models," Nov. 10, 2014 [online] (retrieved from http://http://arxiv.org/pdf/1411.2539v1), 13 pages.

Kulkarni et al., "Baby talk: Understanding and generating simple image descriptions," Computer Vision and Pattern Recognition (CVPR), 2011 IEEE Conference on, IEEE, Jun. 20, 2011, pp. 1601-1608.

Mao et al., "Explain Images with Multimodal Recurrent Neural Networks," Oct. 4, 2014 [online] (retrieved from http://arxiv.org/pdf/1410.1090v1), 9 pages.

Szegedy et al., "Going Deeper with Convolutions," Sep. 17, 2014 [online] (retrieved from http://arxiv.org/pdf/1409.4842), 12 pages.

Office Action issued in Chinese Application No. 201580032854.0, dated May 25, 2018, 14 pages (with English Translation).

Office Action issued in Chinese Application No. 201580032854.0, dated Dec. 27, 2018, 6 pages.

\* cited by examiner

GENERATING NATURAL LANGUAGE DESCRIPTIONS OF IMAGES

CROSS-REFERENCE TO RELATED APPLICATION

This application is a continuation of and claims priority to U.S. application Ser. No. 14/941,454, filed Nov. 13, 2015, which claims priority to U.S. Provisional Application No. 62/080,081, filed on Nov. 14, 2014. The disclosure of the prior applications are considered part of and are incorporated by reference in their entirety in the disclosure of this application.

BACKGROUND

This specification relates to generating a natural language description of an input image using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes how a system implemented as computer programs on one or more computers in one or more locations can generate a natural language description of an image.

Particular embodiments of the subject matter described in this specification can be implemented so as to realize one or more of the following advantages. A system can be trained to automatically describe the contents of an input image by generating a properly formed sequence of natural language words. Advantageously, and unlike previous approaches, the system can be an end-to-end system that is fully trainable using stochastic gradient descent and can yield better performance on image description tasks than previous approaches. The sequence of words generated by the system can capture not only the objects contained in the image, but also express how the objects relate to each other as well as their attributes and the activities they are involved in. In order to generate the description, the neural network effectively combines a model for visual understanding with a language model.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
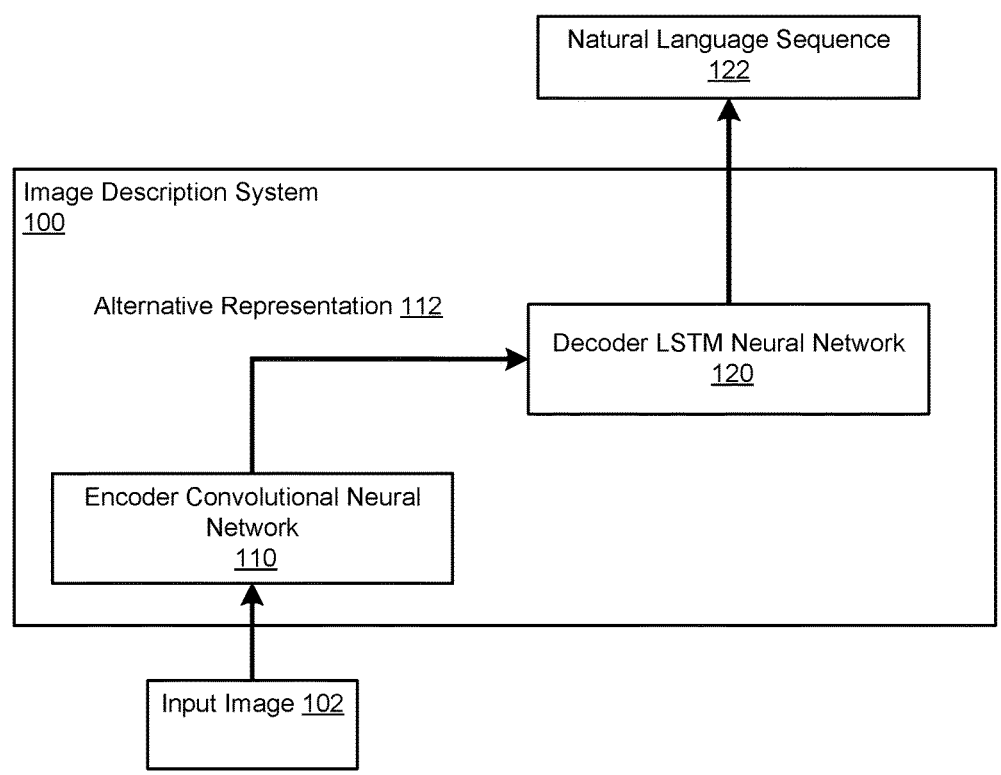
FIG. 1 shows an example image description system.

FIG. 1 shows an example image description system 100. The image description system 100 is an example of a system implemented as computer programs on one or more computers in one or more locations, in which the systems, components, and techniques described below can be implemented.

The image description system 100 receives an input image 102 and generates a natural language sequence 122 for the input image 102. The natural language sequence 122 is a sequence of words in a target natural language that describes the input image 102. Generally, the natural language sequences generated by the image description system 100 are variable-length sequences, i.e., sequences that can contain varying numbers of words in the target natural language.

The image description system 100 includes an encoder convolutional neural network 110 and a decoder LSTM neural network 120.

As part of generating the natural language sequence 122 for the input image 102, the image description system 100 processes the input image 102 using the encoder convolutional neural network 110 to generate an alternative representation 112 for the input image 102.

The encoder convolutional neural network 110 is a convolutional neural network that receives an input image and generates an alternative representation from the input image in accordance with a set of parameters.

In particular, the encoder convolutional neural network can be a portion of another deep convolutional neural network that has been configured to classify objects in images, i.e., to receive input images and, for each input image, generate a respective score for each object category of a pre-determined set of object categories. The score for a given category represents a likelihood that the input image includes an image of an object in the category.

More specifically, the other image classification neural network includes multiple core layers and an output layer. The core layers collectively process an input image to generate an alternative representation of the input image and the output layer receives the alternative representation from the core layers and generates the category scores for the input image from the alternative representation. For example, the output layer may be a softmax layer. An example of such a deep convolutional neural network for classifying objects in images is described in more detail in C. Szegedy, W. Liu, Y. Jia, P. Sermanet, S. Reed, D.

Anguelov, D. Erhan, V. Vanhoucke, and A. Rabinovich. *Going deeper with convolutions*, available at http://arxiv.org/pdf/1409.4842.

The encoder convolutional neural network 110 can be the other deep convolutional neural network, but with the output layer removed, so that the encoder convolutional neural network 110 includes only the core layers from the other deep convolutional neural network and the output generated by the encoder convolutional neural network 110 for the input image 102 is the alternative representation 122.

Generating an alternative representation using the encoder convolutional neural network 110 is described in more detail below with reference to FIG. 2.

The image description system 100 processes the generated alternative representation 122 of the input image 102 using the decoder LSTM neural network 120 to generate the natural language sequence 122 for the input image 102.

The decoder LSTM neural network 120 is an LSTM neural network that includes one or more LSTM neural network layers, with each of the LSTM layers including one or more LSTM memory blocks. Each LSTM memory block can include one or more cells that each include an input gate, a forget gate, and an output gate that allow the cell to store previous activations generated by the cell, e.g., as a hidden state for use in generating a current activation or to be provided to other components of the LSTM neural network 110. An example LSTM neural network is described in more detail in "Generating sequences with recurrent neural networks," Alex Graves, available at http://arxiv.org/abs/1308.0850v5.

In particular, the decoder LSTM neural network 120 is configured to receive a current word in a natural language sequence and to generate a respective word score for each of a set of possible words from the current word and in accordance with the current hidden state of the decoder LSTM neural network 120 and current values of a set of parameters. The word score for a given word represents the likelihood that the word is the next word in the natural language sequence, i.e., the likelihood that the output immediately follows the current word in the natural language sequence. As part of generating the word scores, the decoder LSTM neural network 120 also updates the hidden state of the network to generate an updated hidden state.

The set of possible words includes a vocabulary of words in the target natural language and a designated stop word. The stop word is a designated word that is not in the vocabulary of words in the natural language.

Processing an alternative representation using the decoder LSTM neural network to generate a natural language sequence is described in more detail below with reference to FIGS. 2 and 3.

Figure 2:
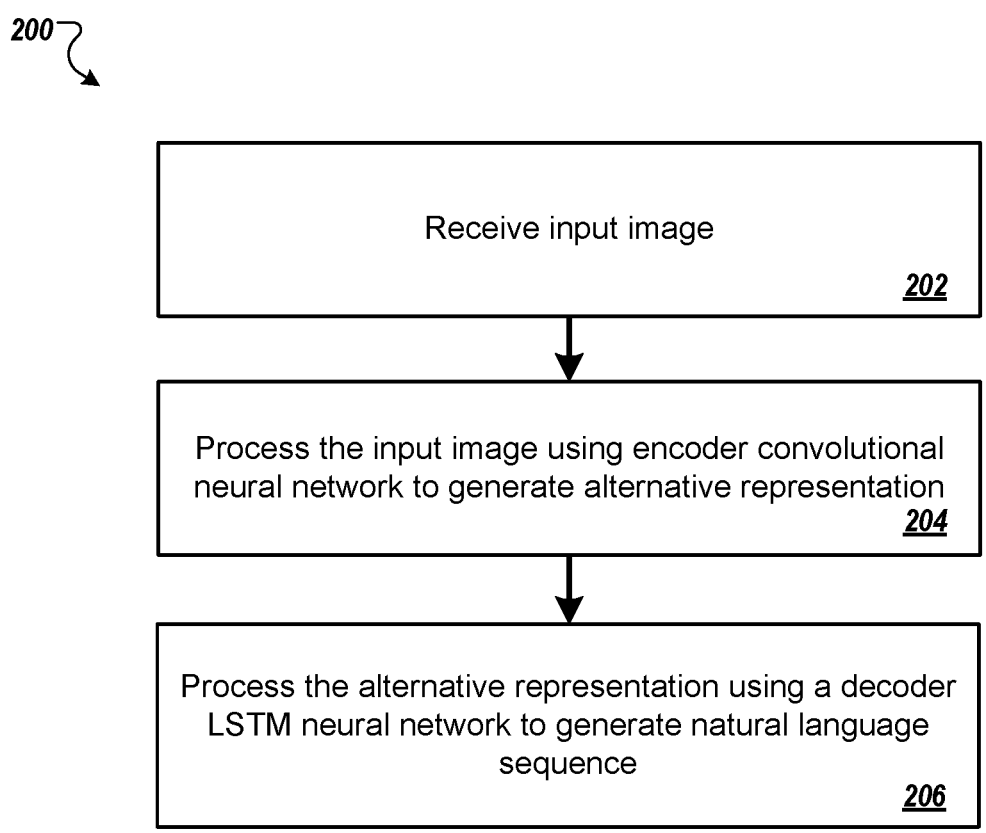
FIG. 2 is a flow diagram of generating a natural language description for an input image.

FIG. 2 is a flow diagram of an example process 200 for generating a natural language sequence from an input image. For convenience, the process 200 will be described as being performed by a system of one or more computers located in one or more locations. For example, an image description system, e.g., the image description system 100 of FIG. 1, appropriately programmed, can perform the process 200.

The system obtains an input image (step 202).

The system processes the input image using an encoder convolutional neural network, e.g., the encoder convolutional neural network 110 of FIG. 1, to generate the input image into an alternative representation for the input image (step 204). That is, the system processes the input image through each of the core layers in the encoder convolutional neural network to generate the alternative representation, i.e., the alternative representation is the output of the last core layer in the encoder convolutional neural network.

Thus, because the alternative representation is the output of the last core layer, the alternative representation of the input image is a fixed-length representation, i.e., the number of elements in the alternative representation is fixed and is not dependent on the input image. For example, the alternative representation may be a vector of numeric values that has a fixed dimensionality, e.g., a vector of floating point values or of quantized representations of floating point values.

The system processes the alternative representation using a decoder LSTM neural network, e.g., the decoder LSTM neural network 120 of FIG. 1, to generate a natural language sequence for the input image (step 206). The natural language sequence is a sequence of words in a target natural language that are arranged according to an output order. The decoder LSTM neural network and the encoder convolutional neural network have been configured through training to generate natural language sequences that are descriptions of the corresponding input images.

Generally, the system processes the alternative representation using the decoder LSTM neural network by initializing an initial hidden state of the decoder LSTM using the alternative representation of the input image. For example, the system can provide the alternative representation as an initial input to the decoder LSTM neural network and the decoder LSTM neural network can process the alternative representation in order to initialize the initial hidden state for generating the words in the natural language sequence.

Once the hidden state of the decoder LSTM neural network has been initialized using the alternative representation, the decoder LSTM neural network receives a current word in a natural language sequence, maps the current word to a numeric representation, and then processes the numeric representation to generate a respective word score for each of a set of possible words from the current output and in accordance with the current hidden state of the decoder LSTM neural network and current values of a set of parameters. The decoder LSTM neural network also updates the current hidden state as part of processing the numeric representation.

Generally, the numeric representation is a fixed-length representation that has the same dimensionality as the alternative representation of the input image. Generating the natural language sequence using the decoder LSTM neural network will be described in more detail below with reference to FIG. 3.

Figure 3:
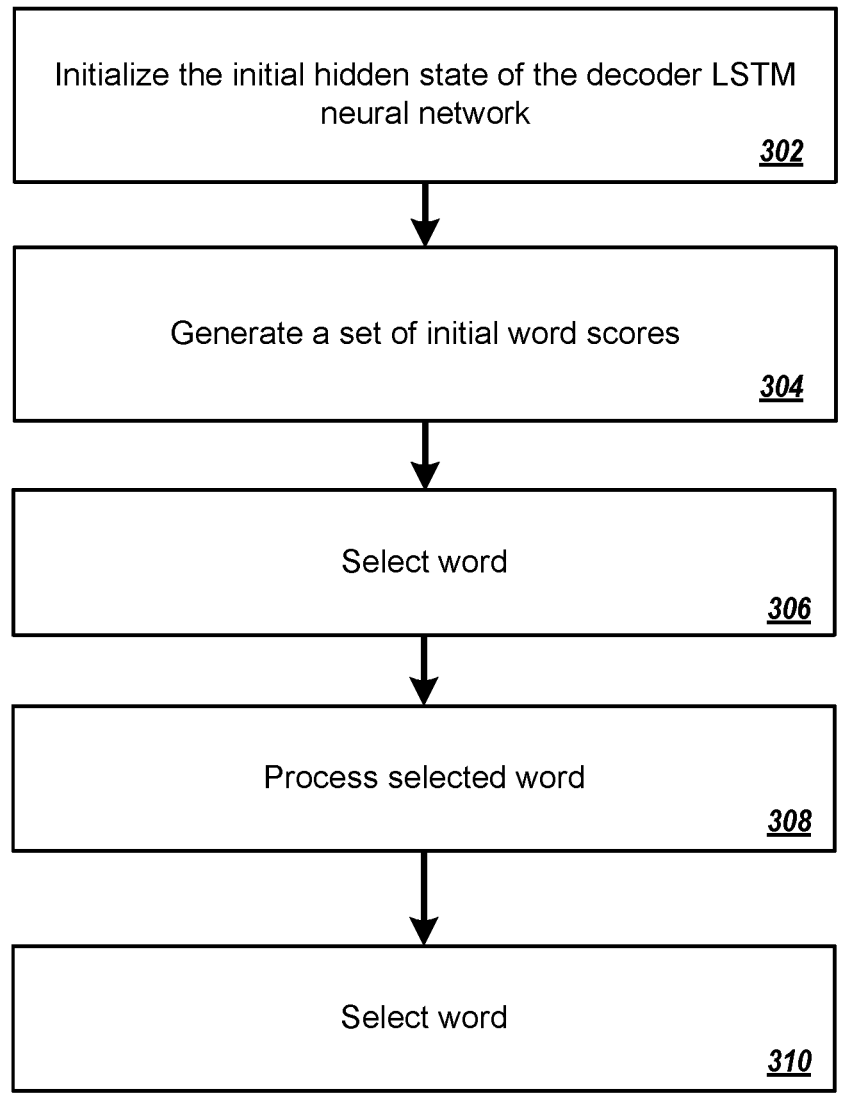
FIG. 3 is a flow diagram of an example process for generating a natural language sequence using a decoder LSTM neural network.

FIG. 3 is a flow diagram of an example process 300 for generating a natural language sequence using a decoder LSTM neural network. For convenience, the process 300 will be described as being performed by a system of one or more computers located in one or more locations. For example, an image description system, e.g., the image description system 100 of FIG. 1, appropriately programmed, can perform the process 300.

The system initializes the initial hidden state of the decoder LSTM neural network using the alternative representation of the input image (step 302). That is, the system provides the alternative representation as an initial input to the decoder LSTM neural network and the decoder LSTM neural network processes the alternative representation in order to initialize the initial hidden state for generating the words in the natural language sequence.

The system generates a set of initial word scores using the decoder LSTM neural network in accordance with the initial hidden state (step 304). That is, the system processes a special start word using the decoder LSTM neural network in accordance with the initial hidden state to generate the initial word scores and to generate an updated hidden state using the initial hidden state. As described above, the decoder LSTM neural network is configured to map a given input word to a numeric representation and then to process the numeric representation to generate a set of word scores and to generate an updated hidden state in accordance with the current hidden state of the decoder LSTM neural network and current values of the parameters of the decoder LSTM neural network.

The system selects a word from the vocabulary of words using the initial word scores as the first word in the natural language sequence (step 306). In some implementations, the system selects the highest-scoring word according to the initial word scores. In some other implementations, the system samples from the vocabulary of words in accordance with the initial word scores to select the word.

The system processes the selected word using the decoder LSTM neural network to generate a set of next word scores (step 308). That is, the system processes the selected word in accordance with the updated hidden state of the network to generate the set of next word scores and to again update the hidden state of the network.

The system selects a word from the vocabulary of words using the next word scores as the next word in the natural language sequence (step 310), e.g., as described above with reference to step 306.

The system can repeat steps 308 and 310 to add words to the natural language sequence and to update the hidden state of the network until the selected word is the stop word rather than one of the words from the vocabulary of words. The system can then consider, as the natural language sequence, the sequence of words that were selected prior to the stop word.

In some implementations, the system generates multiple possible natural language sequences and determines a respective sequence score for each possible natural language sequence. The system can then select the possible natural language sequence having the highest sequence score as the natural language sequence. In particular, the system can generate the possible natural language sequences by performing a beam search decoding using the decoder LSTM neural network.

Figure 4:
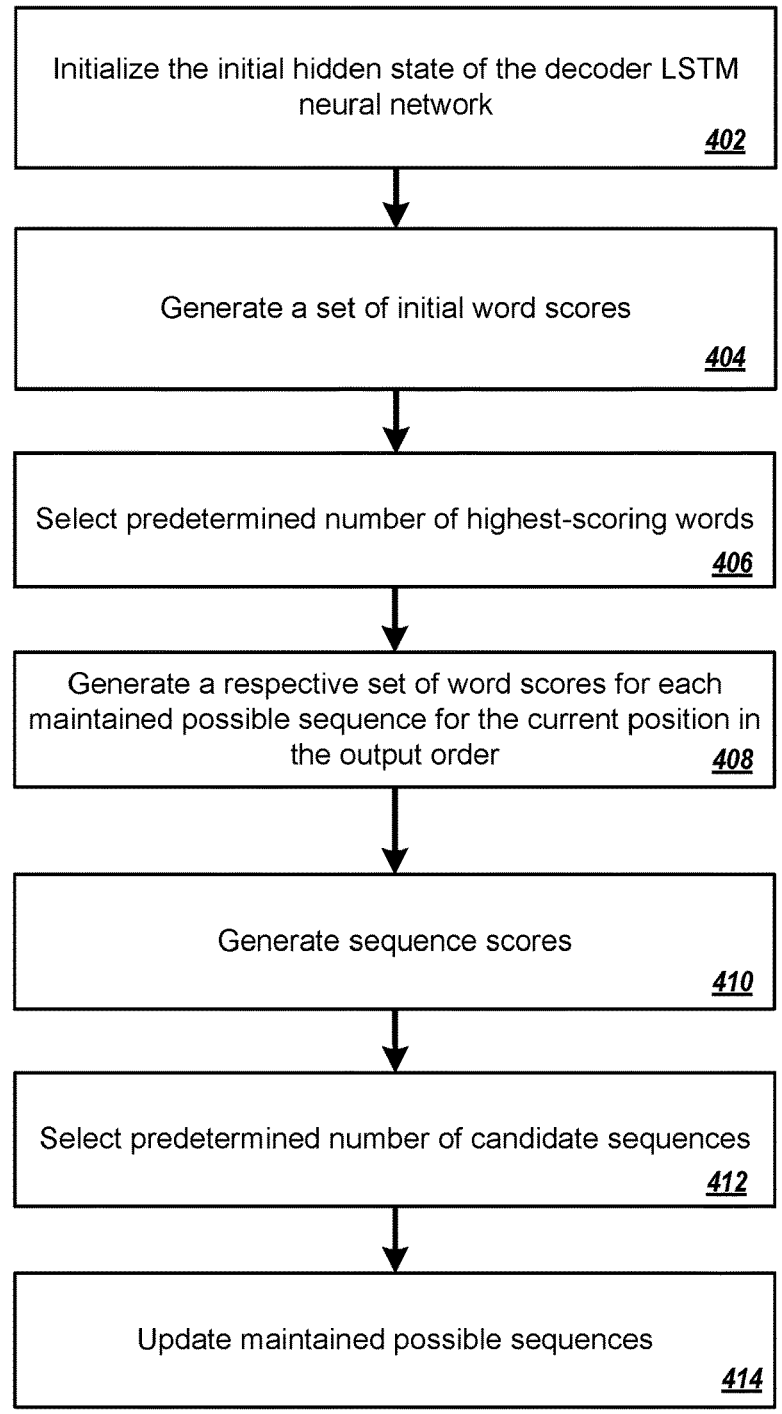
FIG. 4 is a flow diagram of an example process for performing a beam search decoding using a decoder LSTM neural network.

FIG. 4 is a flow diagram of an example process 400 for performing a beam search decoding using a decoder LSTM neural network. For convenience, the process 400 will be described as being performed by a system of one or more computers located in one or more locations. For example, an image description system, e.g., the image description system 100 of FIG. 1, appropriately programmed, can perform the process 400.

The system initializes the initial hidden state of the decoder LSTM neural network to the alternative representation of the input image (step 402).

The system generates the set of initial word scores using the decoder LSTM neural network in accordance with the initial hidden state (step 404).

The system selects a predetermined number of highest-scoring possible words according to the initial scores (step 406). The system generates a respective possible natural language sequence for each selected possible word, each possible natural language sequence including the corresponding selected possible word at the first position in the output order. The system associates the possible natural language sequence with the initial score for the corresponding possible word as the sequence score for the possible natural language sequence.

The system generates a respective set of word scores for each maintained possible natural language sequence for the current position in the output order (step 408). That is, for each maintained possible natural language sequence, the system processes the current word in the possible natural language sequence using the decoder LSTM neural network to generate a set of word scores in accordance with the current hidden state of the decoder LSTM neural network for the possible word sequence. The set of word scores includes a respective word score for each of the set of possible words. The system processes each maintained possible natural language sequence independently from each other maintained possible natural language sequence, so that the hidden state of the decoder LSTM used to generate the set of word scores for the current word in a given possible natural language sequence is based only on the processing of the possible natural language sequence and not on the selected words for any other possible natural language sequence.

For example, once the system has selected the possible words for the first position in the output order, the system can process each of the selected first position words using the decoder LSTM neural network to generate a respective set of word scores for each selected first position word.

The system generates, for each maintained possible natural language sequence, a respective sequence score for each possible candidate natural language sequence that can be generated from the possible natural language sequence (step 410). A candidate natural language sequence for a given possible natural language sequence is a sequence that appends one of the possible words to the end of the possible natural language sequence. The sequence score for the candidate natural language sequence is the sequence score for the possible natural language sequence multiplied by the word score for the appended possible word.

The system selects the predetermined number of candidate natural language sequences that have the highest sequence scores (step 412).

The system updates the maintained possible natural language sequences to be the selected candidate natural language sequences (step 414).

When a selected candidate natural language sequence ends with the stop word, the system removes the selected candidate natural language sequence from the beam, i.e., stops adding additional words to the selected candidate natural language sequence, and considers the selected candidate natural language sequence prior to the stop word being added to be a final possible natural language sequence. The system also reduces the predetermined number of sequences to be maintained by one.

The system can repeat steps 408-414 of the process 400 until each maintained possible natural language sequence has been finalized. The system can then select the final possible natural language sequence having the highest sequence score as the natural language sequence for the input image or can provide multiple ones of the final possible natural language sequences as possible natural language sequences for the input image.

In order to configure the decoder LSTM neural network, the system trains the network using conventional machine learning training techniques, e.g., using Stochastic Gradient Descent. In order to configure the encoder convolutional network, the system trains an image classification convolutional neural network having core layers and an output layer, e.g., the image classification neural network described above with reference to FIG. 1, to classify images and then uses the trained values of the parameters of the core layers as the values of the parameters of the encoder convolutional neural network. In some implementations, the system can then train the networks jointly by backpropagating gradients computed for the decoder LSTM neural network back to the encoder convolutional neural network to adjust the values of the parameters of the encoder convolutional neural network during the training technique. In some of these implementations, the system only adjusts the parameters of the top layer of the encoder convolutional neural network while holding the values of the parameters of the remaining layers fixed during this training.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. One or more non-transitory computer-storage media having instructions encoded thereon that, when executed by one or more computers, cause the one or more computers to perform operations comprising:
    obtaining an input image;
    processing the input image using a first neural network to generate an alternative representation for the input image; and
    processing, with a long-short term memory (LSTM) neural network, the alternative representation for the input image to generate an output sequence of words in a target natural language that describes the input image, wherein:
    the words in the output sequence are arranged according to an output order, and
    processing the alternative representation for the input image comprises, for each position in the output order after an initial position:
        (i) identifying a word that was selected for the output sequence at a preceding position in the output order that precedes the current position;
        (ii) processing, with the LSTM neural network, data representing the word that was selected for the output sequence at the preceding position in the output order to generate respective word scores for words in a pre-defined set of possible words, and
        (iii) selecting, from the pre-defined set of possible words and based on the respective word scores, a particular word for the output sequence for the current position in the output order.

2. The one or more computer-storage media of claim 1, wherein processing the alternative representation for the input image further comprises, for the initial position in the output order:
    processing, with the LSTM neural network, a special start word to generate respective word scores for words in the pre-defined set of possible words; and
    selecting, from the pre-defined set of possible words and based on the respective word scores, a particular word for the initial position in the output order of the output sequence of words.

3. The one or more computer-storage media of claim 1, wherein processing the alternative representation for the input image further comprises:
    using a left-to-right beam search decoding to generate a plurality of possible sequences and a respective sequence score for each of the possible sequences; and
    selecting one or more highest-scoring possible sequences as descriptions of the input image.

4. The one or more computer-storage media of claim 1, wherein the first neural network and the LSTM neural network are jointly trained.

5. The one or more computer-storage media of claim 1, wherein the first neural network is a deep convolutional neural network.

6. The one or more computer-storage media of claim 5, wherein:
    the deep convolutional neural network comprises a plurality of core neural network layers each having a respective set of parameters;
    processing the input image using the first neural network comprises processing the input image through each of the core neural network layers of the deep convolutional neural network; and
    the alternative representation for the input image is the output generated by a last core neural network layer in the plurality of core neural network layers.

7. The one or more computer-storage media of claim 6, wherein:
    current values of the respective sets of parameters are determined by training a third neural network on a plurality of training images; and
    the third neural network includes the plurality of core neural network layers and an output layer configured to, for each training image, receive the output generated by the last core neural network layer for the training image and generate a respective score for each of a plurality of object categories, the respective score for each of the plurality of object categories representing a predicted likelihood that the training image contains an image of an object from the object category.

8. The one or more computer-storage media of claim 1, wherein the pre-defined set of possible words includes a vocabulary of words in the target natural language and a special stop word.

9. A computer-implemented method, comprising:
obtaining an input image;
processing the input image using a first neural network to generate an alternative representation for the input image; and
processing, with a long-short term memory (LSTM) neural network, the alternative representation for the input image to generate an output sequence of words in a target natural language that describes the input image, wherein:
the words in the output sequence are arranged according to an output order, and
processing the alternative representation for the input image comprises, for each position in the output order after an initial position:
  (i) identifying a word that was selected for the output sequence at a preceding position in the output order that precedes the current position;
  (ii) processing, with the LSTM neural network, data representing the word that was selected for the output sequence at the preceding position in the output order to generate respective word scores for words in a pre-defined set of possible words, and
  (iii) selecting, from the pre-defined set of possible words and based on the respective word scores, a particular word for the output sequence for the current position in the output order.

10. The computer-implemented method of claim 9, wherein processing the alternative representation for the input image further comprises, for the initial position in the output order:
processing, with the LSTM neural network, a special start word to generate respective word scores for words in the pre-defined set of possible words; and
selecting, from the pre-defined set of possible words and based on the respective word scores, a particular word for the initial position in the output order of the output sequence of words.

11. The computer-implemented method of claim 9, wherein processing the alternative representation for the input image further comprises:
using a left-to-right beam search decoding to generate a plurality of possible sequences and a respective sequence score for each of the possible sequences; and
selecting one or more highest-scoring possible sequences as descriptions of the input image.

12. The computer-implemented method of claim 9, wherein the first neural network and the LSTM neural network are jointly trained.

13. The computer-implemented method of claim 9, wherein the first neural network is a deep convolutional neural network.

14. The computer-implemented method of claim 13, wherein:
the deep convolutional neural network comprises a plurality of core neural network layers each having a respective set of parameters;
processing the input image using the first neural network comprises processing the input image through each of the core neural network layers of the deep convolutional neural network; and
the alternative representation for the input image is the output generated by a last core neural network layer in the plurality of core neural network layers.

15. The computer-implemented method of claim 14, wherein:
current values of the respective sets of parameters are determined by training a third neural network on a plurality of training images; and
the third neural network includes the plurality of core neural network layers and an output layer configured to, for each training image, receive the output generated by the last core neural network layer for the training image and generate a respective score for each of a plurality of object categories, the respective score for each of the plurality of object categories representing a predicted likelihood that the training image contains an image of an object from the object category.

16. The computer-implemented method of claim 9, wherein the pre-defined set of possible words includes a vocabulary of words in the target natural language and a special stop word.

17. A system comprising one or more computers and one or more storage devices storing instructions that are operable, when executed by the one or more computers, to cause the one or more computers to perform operations comprising:
obtaining an input image;
processing the input image using a first neural network to generate an alternative representation for the input image; and
processing, with a long-short term memory (LSTM) neural network, the alternative representation for the input image to generate an output sequence of words in a target natural language that describes the input image, wherein:
the words in the output sequence are arranged according to an output order, and
processing the alternative representation for the input image comprises, for each position in the output order after an initial position:
  (i) identifying a word that was selected for the output sequence at a preceding position in the output order that precedes the current position;
  (ii) processing, with the LSTM neural network, data representing the word that was selected for the output sequence at the preceding position in the output order to generate respective word scores for words in a pre-defined set of possible words, and
  (iii) selecting, from the pre-defined set of possible words and based on the respective word scores, a particular word for the output sequence for the current position in the output order.

18. The system of claim 17, wherein processing the alternative representation for the input image further comprises, for the initial position in the output order:
processing, with the LSTM neural network, a special start word to generate respective word scores for words in the pre-defined set of possible words; and
selecting, from the pre-defined set of possible words and based on the respective word scores, a particular word for the initial position in the output order of the output sequence of words.

19. The system of claim 17, wherein processing the alternative representation for the input image further comprises:
using a left-to-right beam search decoding to generate a plurality of possible sequences and a respective sequence score for each of the possible sequences; and
selecting one or more highest-scoring possible sequences as descriptions of the input image.

20. The system of claim 17, wherein the first neural network is a deep convolutional neural network.

\* \* \* \* \*